United States Patent [19]
Root et al.

[11] Patent Number: 5,303,157
[45] Date of Patent: Apr. 12, 1994

[54] SINGLE HANDLE LOCOMOTIVE CONTROLLER

[75] Inventors: Kevin B. Root, Black River; John J. Allen, Watertown; Ronald O. Newton, Adams, all of N.Y.

[73] Assignee: Knorr Brake Holding Corporation, Westminster, Md.

[21] Appl. No.: 101,266

[22] Filed: Jun. 23, 1993

Related U.S. Application Data

[63] Continuation of Ser. No. 620,827, Dec. 3, 1990, abandoned.

[51] Int. Cl.$^5$ .......................... B60T 13/66; B60T 13/74
[52] U.S. Cl. .......................... 364/426.05; 246/182 R; 303/3; 303/15
[58] Field of Search .......................... 364/426.01, 426.05; 246/182 R, 182 A, 182 B, 182 BH, 182 C, 182 AA, 182 AB, 183, 186, 187 R, 187 C; 303/2, 3, 13, 15, 20, 22.6

[56] References Cited

U.S. PATENT DOCUMENTS

| | | | |
|---|---|---|---|
| 4,005,837 | 2/1977 | Grundy | 364/426.05 X |
| 4,401,035 | 8/1983 | Spigarelli et al. | 364/426.05 X |
| 4,402,047 | 8/1983 | Newton et al. | 364/426.01 |
| 4,652,057 | 3/1987 | Engle et al. | 246/182 R X |
| 4,835,693 | 5/1989 | Smith et al. | 364/426.01 |
| 4,865,278 | 9/1989 | Kitaue | 246/182 A |
| 4,901,953 | 2/1990 | Munetika | 246/182 R |

Primary Examiner—Thomas G. Black
Assistant Examiner—Collin W. Park
Attorney, Agent, or Firm—Barnes & Thornburg

[57] ABSTRACT

A locomotive control system having a single handle movable between a maximum propulsion position, through diminishing propulsion positions, through a release/idle position, through increasing braking positions, through a full service brake position to an emergency brake position. The control system receives position signals from the handle and generates propulsion, dynamic braking and fluid braking control signals as a function of the position signals. For any braking position of the handle, the control system first applies or removes dynamic braking and then provides fluid braking depending upon the position of the handle, the type of train brakes and whether the dynamic braking has maximized or is zero.

15 Claims, 9 Drawing Sheets

SINGLE HANDLE LOCOMOTIVE CONTROLLER

This is a continuation of application Ser. No. 07/620,827, filed Dec. 3, 1990, now abandoned.

BACKGROUND AND SUMMARY OF THE INVENTION

This invention relates generally to novel and improved brake equipment for rail vehicles and more particularly to a single handle computer controlled propulsion and brake equipment located on the locomotive and arranged to control the propulsion of such locomotive and any trailing locomotive and the application and release of the brakes of such locomotive, any trailing locomotive, and any cars coupled to either.

Figure 1:
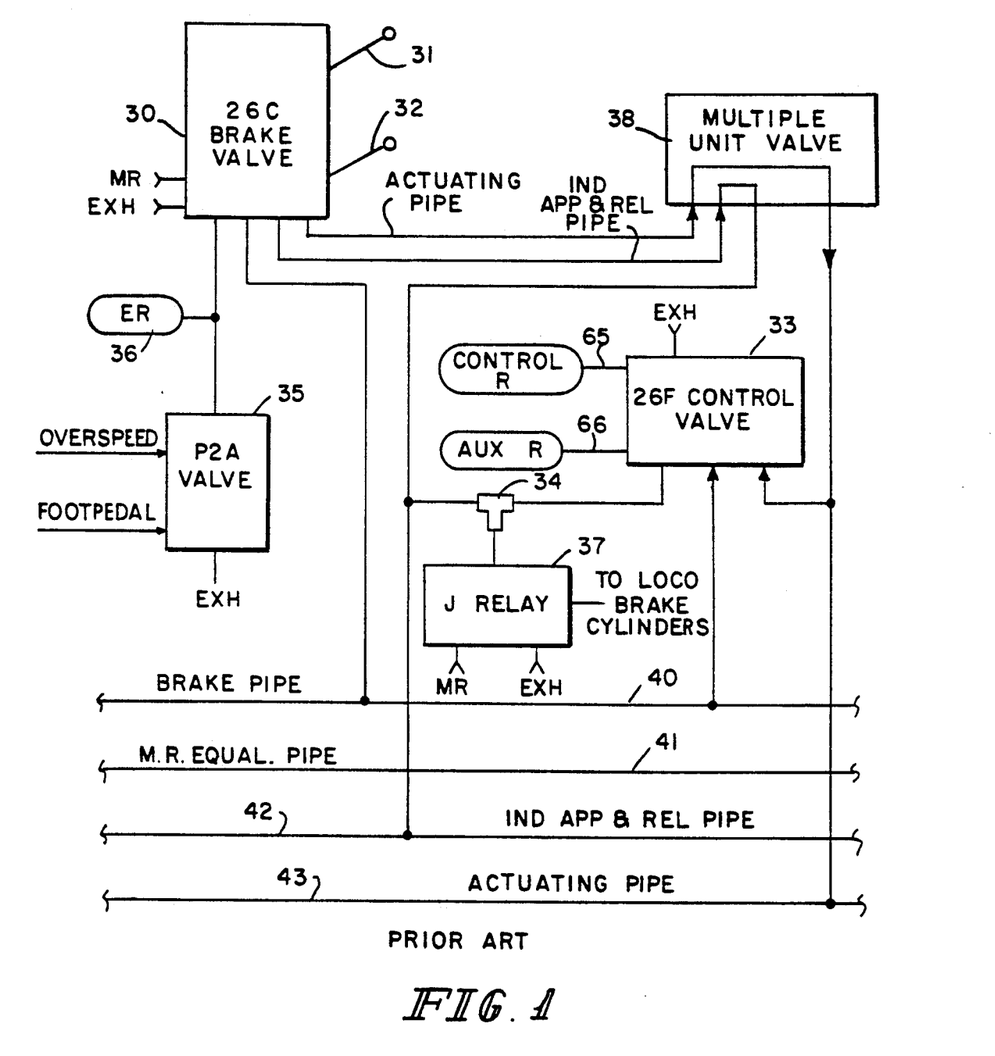
FIG. 1 is a block diagram of a pneumatic brake system of the prior art.

Prior art brake equipment for locomotives has typically been implemented with mechanical and pneumatic hardware, as, for example, the 26-L brake equipment of New York Air Brake Company of Watertown, N.Y. As illustrated in FIG. 1, this prior art brake equipment employs as major components a 26-C brake valve 30 including an independent brake valve SA-26, a 26-F control valve 33 and a J relay valve 37 interconnected with various pneumatic pipes represented by solid lines. The brake valve 30 responds to movement by the train operator of an automatic brake handle 31 to regulate pressure in a brake pipe 40 by means of an equalization reservoir 36 and a brake pipe relay in the brake valve 30 for application and release of brakes on the locomotive, the brakes of any trailing locomotive and the brakes of cars coupled to either (train brakes).

The automatic brake handle has six positions as illustrated by the sector diagram in FIG. 2 and defined as follows:

a) The Release position is for charging the brake equipment and releasing the train brakes.

b) In the Minimum Reduction position, brake pipe pressure is reduced a minimum amount so as to initiate quick service on the train brakes (typically 4-6 psi brake pipe reduction), and lightly apply the train brakes.

c) The sector or zone between the Minimum Reduction and Full Service positions is the service zone. As the automatic brake valve handle is moved through this zone from Minimum Reduction toward Full Service, brake pipe pressure is reduced proportionally to 23-26 psi with the handle at the Full Service position, a full service brake application is obtained.

d) In addition to providing full service brake application as with the brake valve handle in the Full Service position, Suppression of overspeed control and safety control application is obtained in the suppression position.

e) The handle is movable to the Handle Off position as for trailing units of a multiple unit locomotive or for locomotive's being towed "dead" in a train. The handle off position is also used for "overreductions" allowing brake pipe to be reduced further than attainable in the Full Service position. Thus assuring full train brake applications.

f) The Emergency position is used for making brake valve emergency brake applications and results in brake pipe exhaust and brake pipe venting at the highest rate of reduction.

The brake valve 30 also responds to movement of an independent brake handle 32 by the train operator to control the application and release of the locomotive brakes independently of the train brakes and for releasing an automatic brake application of the locomotive independently of the train brakes by way of the 26-F control valve 33 and the J relay 37.

Figure 2:
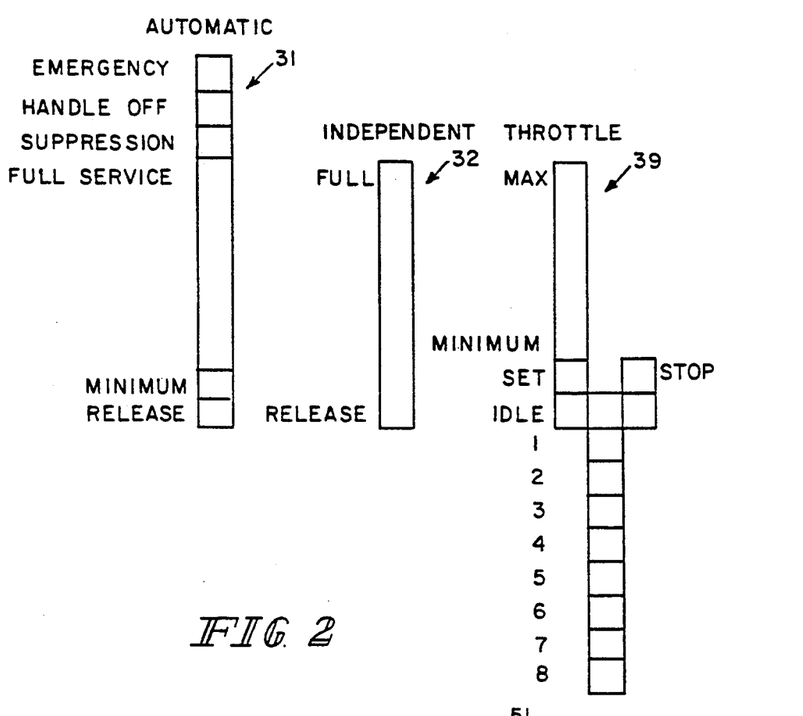
FIG. 2 is a schematic representation of the control handles of the master control stand including the automatic braking, independent braking and the throttle handles of the prior art.

The independent brake handle 32 has two extreme positions, Release and Full Application separated by an application zone as shown in FIG. 2. As the handle is moved from the Release position through the application zone toward the Full Application position will apply the locomotive brakes. The independent handle 32 can be depressed so as to cause the release of any automatic brake application existing on the locomotive (due to operation of the automatic brake handle 31). This is effected via the 26-C brake valve 30 and the 26-F control valve 33. If the independent brake handle 32 is in an Application position, the locomotive brake will be applied according to the higher of independent or automatic brake.

The 26-F control valve 32 and auxiliary reservoir 36 respond to service and emergency rates of brake pipe pressure reduction (brake applications) to control the locomotive brake cylinder pressure via the J relay valve 37. The 26-F control valve 33 also responds to a brake release operation of the independent brake handle 32 to control locomotive brake cylinder pressure to release the locomotive brakes following an automatic brake operation at the service rate developed by operation of the automatic brake handle 31. A key element of the 26-F control valve 30 is a double check valve 34 which applies to the J relay valve 37 the higher of the pressures developed by the 26-F control valve 33 or by the independent application and release pipe 42.

The J relay valve 37 is a volume amplifier that operates to translate the pressure at a smaller volume input to a desired pressure at a larger volume output. As the desired output pressure can differ for different locomotive (different sized brake cylinders), it has been necessary to select a particular J relay valve for a Particular locomotive specification.

The P2-A valve 35 is a brake application or penalty valve responsive to unsafe conditions to effect brake application at the full service rate. For instance, the P2-A valve is illustrated as responding to an overspeed condition and/or to a foot pedal fault (absence of foot pressure on the foot pedal).

The brake equipment also includes a multiple unit valve 38 enabling the locomotive to be united with other locomotives as either a lead, trail or dead unit. The multiple unit valve 38 of a lead unit serves to signal trail units via independent brake application and release pipe 42 and an actuating pipe 43. In the lead position, multiple unit valve 38 connects the actuating pipe signal from brake valve 30 to the control valve 33 and actuating pipe 43 and connects the independent application and release signal from the brake valve 30 to the independent application and release pipe 42.

FIG. 2 also illustrates the third master control stand handle 39 which is the throttle for controlling propulsion and dynamic braking over the 27-wire trainline. The throttle 39 includes the standard 1 to 8 propulsion positions as well as the dynamic braking which goes from a set position to a maximum. Between the propulsion and the dynamic braking portion is the Idle position and a Stop Engine off position. The throttle lever 39 provides an analog output signal proportional to handle position with the maximum output representing maximum power. The throttle 39 is shown as a single handle for both the propulsion and the dynamic braking and is the subject of a copending patent application, but is generally two separate handles in other prior art systems.

The prior art brake equipment is costly to manufacture as it requires substantial iron and aluminum castings for each of the pneumatic valves and is costly to install as it requires numerous pipe interconnections.

Computerized brakes are well known as shown by U.S. Pat. No. 4,402,047 to Newton et al. In this computerized brake control system, the computer calculates the desired brake cylinder pressure from commanded brake signals, vehicle weight, vehicle speed and dynamic braking and compares the desired brake cylinder pressure with the actual brake cylinder pressure. Then it controls the fluid brake system to cause the actual brake pressure to be substantially equal to the desired brake pressure. As illustrated at instruction 338 in FIG. 2 of that patent, the desired brake pressure BCD is equal to the dynamic feedback signal DBC divided by 100 times the desired braking signal BCC. Also as shown at instruction 146 of FIG. 3B, the final desired braking pressure BCF is equal to the load compensated commanded braking pressure BCC minus the speed component BCS minus the dynamic braking component BCD. The analog input signals come from the standard control handles similar to those shown in FIG. 2 herein.

Another system which shows the use of of a computer to control magnetic valves for applying and releasing brake pressure is U.S. Pat. No. 4,652,057 to Engle, et al. A single control handle 76 is used in combination with a control panel 102 and a display 96. The computer provides the appropriate dynamic and fluid brake signals as a function of the position of the control handle 76. Initially, dynamic brakes are applied and augmented by fluid brakes if one or more of the dynamic brakes fail. This system is designed specifically for an integral train where the number of cars per locomotive are fixed and the braking capacity of the cars and the locomotive are known. This system is similar to the systems on mass transit trains using a single handle for propulsion and braking.

In conventional locomotive operation the number and type of locomotives used in a train vary and thus the dynamic braking capacity varies. Also, the number of cars in the train vary widely and have no direct correlation to the number of locomotives. Thus, the engineer or operator must control the level of dynamic and train or fluid braking separately to his satisfaction.

Thus it is an object of the present invention to provide a single control handle for all types of trains and locomotives.

Another object of the present invention is to provide a single handle computerized control system which allows the type of operator control of a plural handle system.

These and other objects are achieved by providing a single handle movable between a maximum propulsion position, through diminishing propulsion positions, through a release/idle position, through increasing braking positions, through a full service brake position to an emergency brake position. A control system receives position signals from the handle and generates propulsion, dynamic braking and fluid braking control signals as a function of the position signals. For any braking position of the handle, the control system first applies or removes dynamic braking and then provides fluid braking depending upon the position of the handle, the type of train brakes and whether the dynamic braking has maximized or is zero. Thus, when the handle position assumes an initial braking position, the control system generates a dynamic braking signal and generates a fluid braking signal if necessary for the braking position.

When the handle assumes the next braking position less than the previous braking position, the control system generates a dynamic braking signal with smaller value than the dynamic braking signal of the previous braking position. On train systems which have a graduated release, when the next braking position is less than the previous braking position, the control means generates a dynamic braking signal of a smaller value than a dynamic signal of a previous braking position until no braking signal is generated and generates a fluid braking signal of a smaller value than a fluid braking signal of the previous braking signal after no dynamic signal is generated for the next braking position. In freight trains, for example, where the fluid brakes do not have a graduated release, the control system generates a dynamic braking signal of smaller value than a dynamic braking signal of the previous braking position until no dynamic braking signal is generated and generates a fluid braking release signal of a smaller value than a fluid braking signal of a previous braking position only when the handle is in the release/idle position.

For an initial braking position or a next braking position greater than a previous braking position, the control system generates a dynamic braking signal until maximum value of the dynamic braking signal is generated and generates a fluid braking signal after the maximum value of the dynamic braking signal is generated. Preferably, the handle includes dynamic braking range positions increasing from the release/idle position to a full dynamic braking position and a fluid braking range of positions increasing from the full dynamic braking position to the full service braking position. The handle would include a detent at the full dynamic braking position to allow the operator to feel when they have gone from the dynamic braking to the fluid braking position. Thus for the initial braking, the operator can apply either just dynamic braking or dynamic braking in combination with fluid braking. Similarly, for subsequent braking, the operator will also know when the fluid braking takes effect. Thus the handle becomes position sensitive until the handle has left the dynamic braking zone and entered the fluid braking zone. Thereafter, for any decreases the dynamic braking is decreased and for any subsequent increases the dynamic braking is reapplied until it has reached its maximum value.

Other objects, advantages and novel features of the present invention will become apparent from the following detailed description of the invention when considered in conjunction with the accompanying drawings.

DETAILED DESCRIPTION OF THE DRAWINGS

Figure 3:
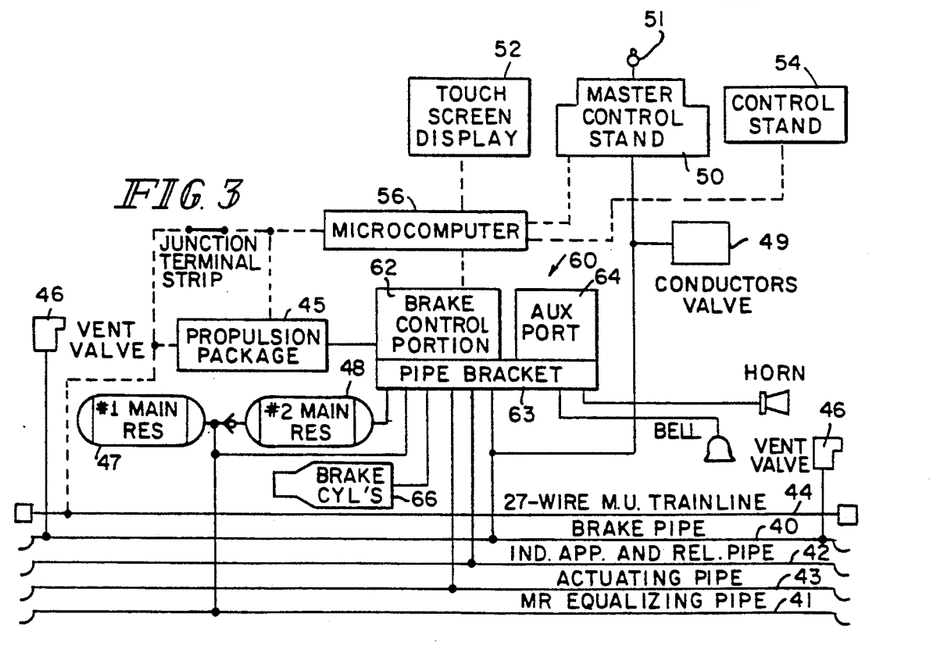
FIG. 3 is a schematic representation of a locomotive control system incorporating the principles of the present invention.

A computerized locomotive control system of the present invention is illustrated in FIG. 3. It should be noted that in the Figures the fluid lines of the pneumatic system will be illustrated by solid lines whereas the electrical interconnections will be illustrated by dash lines. Wherever possible the elements, for example the trainlines and the control handles, in the Figures will have the same numbers as those of the prior art described in FIGS. 1 and 2. A master control stand 50 includes a single control handle 51 which replaces the automatic brake handle 31 and the separate or combined dynamic brake and throttle 39. Preferably, the independent brake handle 32 and its function have been deleted. Alternatively it may be included as a separate handle. The locomotive includes the brake pipe 40, the master reservoir equalization pipe 41, the independent application and release pipe 42, actuating pipe 43, and a 27-wire multiple unit electrical trainline 44. The standard pair of venting valves 46 are provided on the brake pipe 42.

The master control stand 50 is fluidly connected to the brake pipe 40 so as to directly apply an emergency condition fluidly to the brake pipe. A conductor valve 49 is also connected to the brake pipe 40 to apply an emergency condition. The master control stand 50 is electrically connected to the microcomputer 56 as are touch screen display 52 and an auxiliary control stand 54. Microcomputer 56 is connected to the propulsion package 45, which is a standard prior art propulsion package, and both are connected to the 27-wire trainline 44 for electrically communicating with the other locomotives on the train.

An electro-pneumatic interface control valve 60 between the microcomputer 56 and the pneumatic braking system is shown as including the brake control portion 62 and an auxiliary portion 64 both connected to pipe bracket 63. Interface control valve 60 provides all the functions of the control of the brakes, both pneumatically and electrical signalling, and for auxiliary controls. The pipe bracket 63 is a connection of all pipe interfaces which provides a unitized valve for simplification of maintenance The pipe bracket has the required reservoir for brake operations and contains disposable filters for the pneumatic inputs. The brake control portions 62 provides for all braking portions found on the locomotive. This controls the brake pipe 40, the brake cylinder of the locomotive 66, independent brake pipe 42 and actuating pipe 43. It provides all the required electrical interfaces for the operation of the brake system. The auxiliary portion 64 provides pneumatic controls for the special functions. This may be for the sanding, pneumatic horns, bells, etc. Auxiliary portion 64 operates independent of the brake valve. A first main reservoir 47 is connected to the main reservoir equalization pipe 41 as is a second main reservoir 48. The second main reservoir 48 is connected to the electro-pneumatic interface control valve 60.

The electro-pneumatic interface control valve 60 is described in detail in copending United States patent application Ser. No. 07/447,816 by K. B. Root et al. and is incorporated herein by reference. Other computer controlled braking systems may be used with the single control handle design of the present invention including those previously discussed.

The system of FIG. 3 is a simplification of the controls by location. Controls have been consolidated into a single handle master controller unit 50 and a touch screen display 52. All of the normal train operation will be obtainable through these two devices. A fuel pump, engine run, headlights, auxiliary lights and heater controls are not incorporated into the microcomputer 56 since they would not simplify the operation. These functions are in the auxiliary control stand 54.

Figure 4:
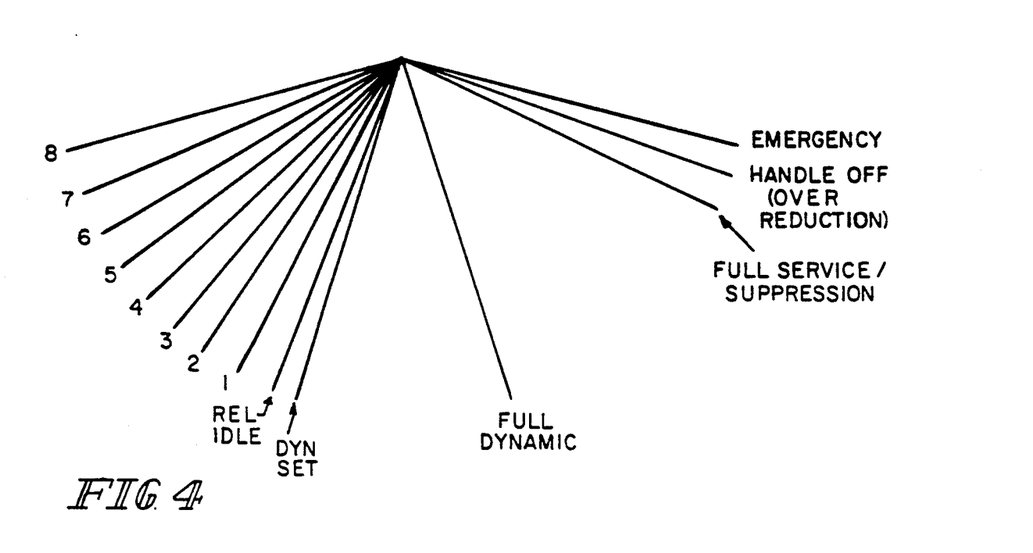
FIG. 4 is a diagram of the layout of a single control handle according to the principles of the present invention.

The layout or the positions of the handles is illustrated in FIG. 4 as beginning with a maximum propulsion position 8 and diminishing propulsion positions 7 through 1 to the release/idle position. Next is the dynamic set or zero position with increased dynamic braking to the full dynamic position. The next zone increases the fluid braking through to full service/suppression. This is followed by handle off or over-reduction and ends finally with the emergency brake position. The signals from the handle 51 are provided to the computer 56 as an analog signal. Preferably, a pair of limit switches are set at the two extremers, namely the 8th propulsion position and the emergency. A potentiometer is connected between the two limit switches providing an analog signal. This is but an example of converting the position of the handle into signals capable of being used by the microcomputer 56 and other systems may be used.

The propulsion level is controlled by placing the handle within the proper zone. Notches one through eight are detented positions and the microcomputer 56 provides the appropriates on the locomotive 27-wire train line 44. The release/idle position is also detented and denotes a full brake release and no applied propulsion.

Figure 5:
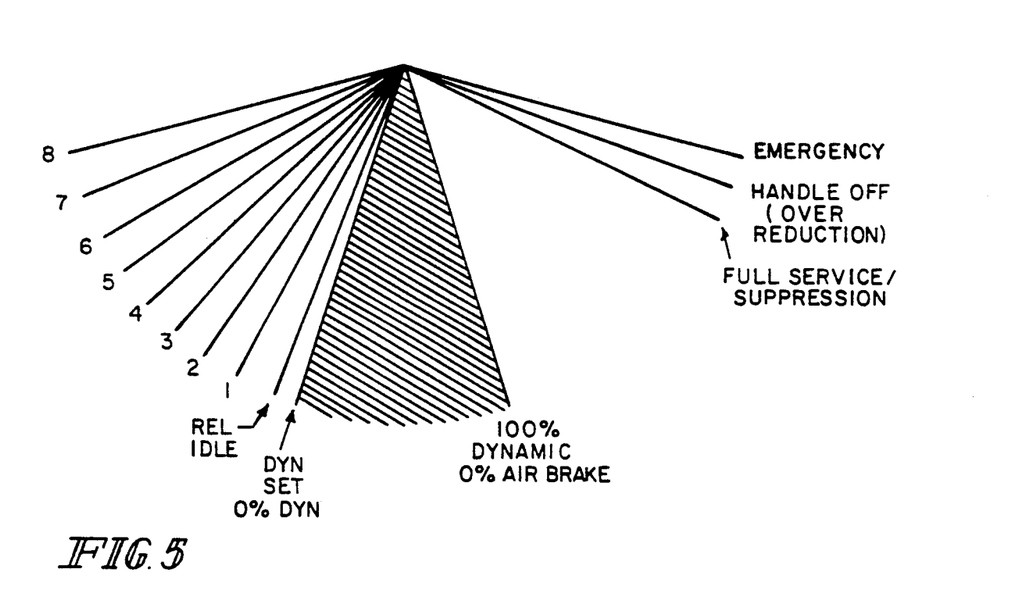
FIG. 5 is a diagram showing an initial position of 100% dynamic braking.
Figure 6:
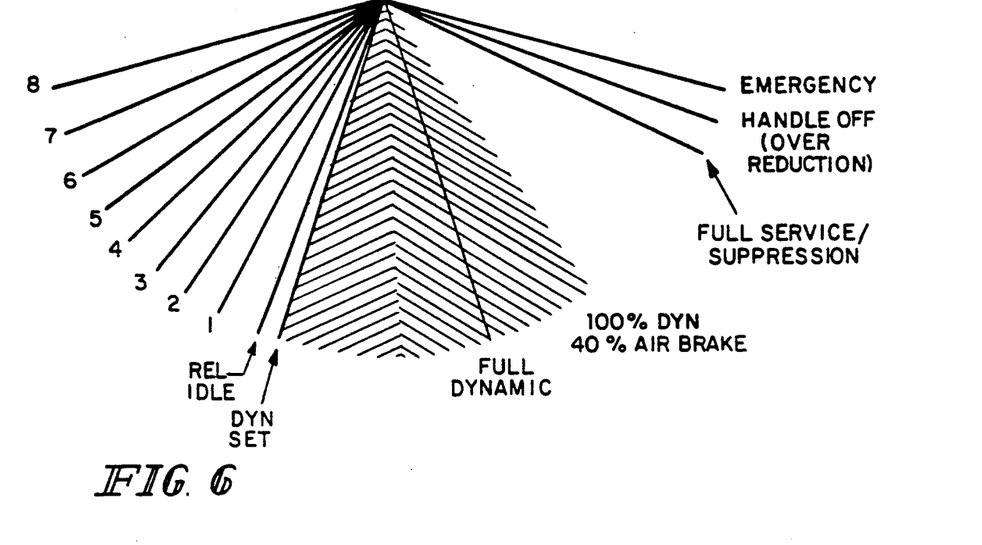
FIG. 6 is a diagram of an initial position of 100% dynamic braking and 40% air braking or an increased position over that of FIG. 5.

The dynamic set position, is detented, and allows the microcomputer 56 to initiate the sequence of dynamic braking. Movement of the handle from the dynamic set position towards the full dynamic position will be interpreted by the microcomputer 56 and will provide an increasing level of the dynamic braking. Once the full dynamic position is achieved as illustrated in FIG. 5, all available dynamic braking is applied. Preferably, the full dynamic braking position is detented such that the operator can tell through the handle that he has reached the full dynamic braking position. Reduction of the dynamic braking effort is achieved by moving the handle back towards the dynamic set position. As will be explained more fully with respect to the remaining drawings. Any decrease in handle position irrespective of its initial position will first decrease the dynamic braking Any further movement of the handle past the full dynamic braking position will signal to the microcomputer 56 to begin to apply fluid or air brakes. As illustrated in FIG. 6, the position of the handle would result in 100% of dynamic braking and 40% of air brakes. This position is either the initial position of the braking or an increased brake position from any prior brake condition which has not been decreased from the initial braking position. Further movement from the position in FIG. 6 towards the full service position will further increase the air or level of automatic air braking. The dynamic braking shall remain at its maximum level. Once the full service position is reached and detent, the maximum automatic air brake capacity has been reached. The microcomputer 56 will not allow any fluid or air brakes to be applied until 100% of the dynamic braking has been applied.

Figure 7:
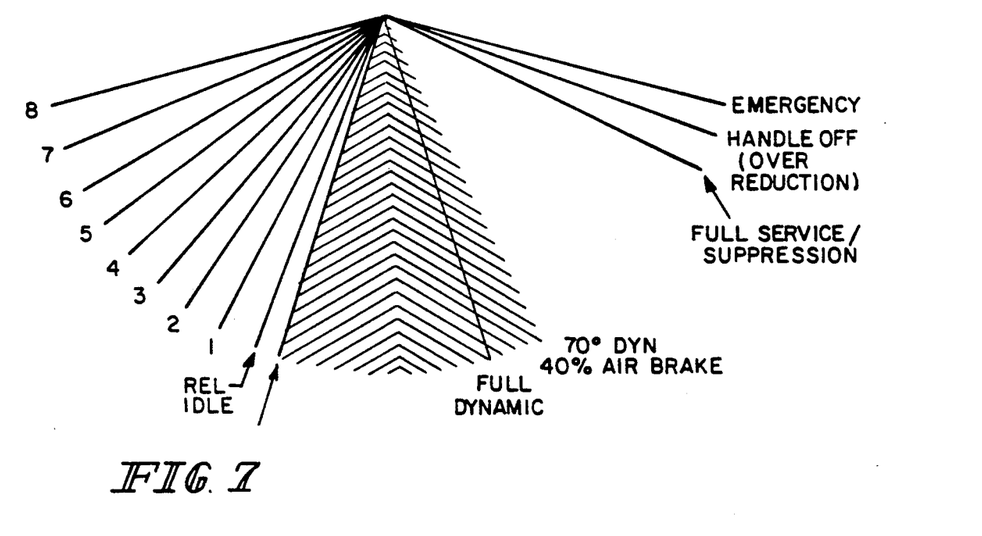
FIG. 7 is a diagram of a decreased braking position from that of FIG. 6.
Figure 8:
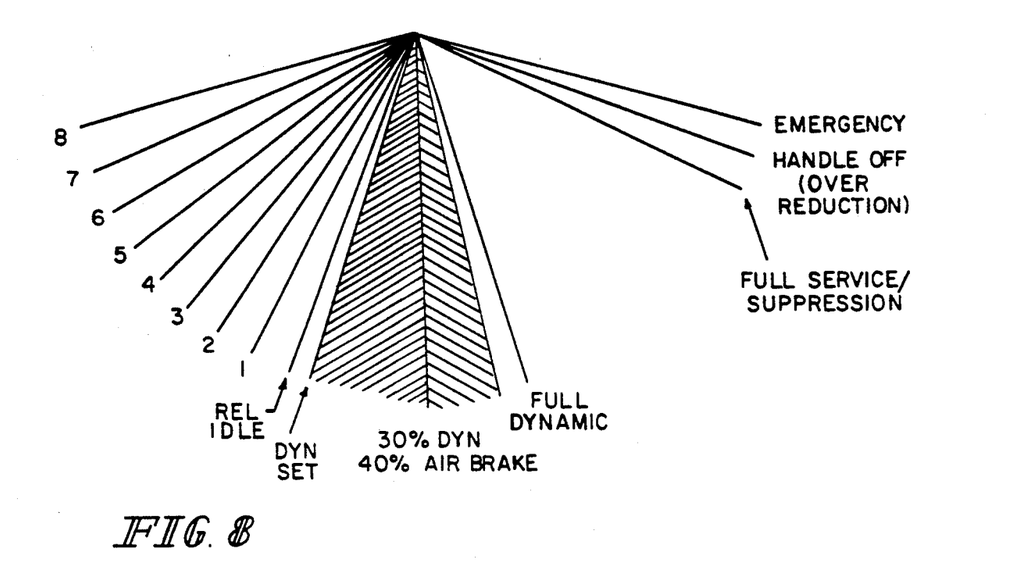
FIG. 8 is a diagram of a decreased braking position from that of FIGS. 6 or 7.
Figure 9:
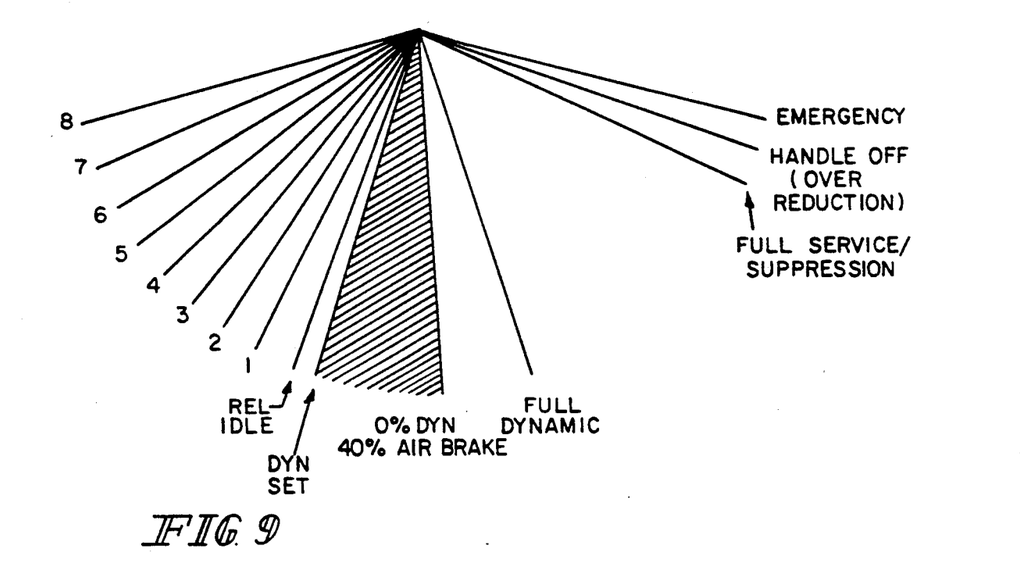
FIG. 9 is a diagram of a decreased braking position from that of FIGS. 6, 7 or 8.

To decrease the dynamic braking, the handle only has to be moved towards the dynamic set position. As illustrated in FIG. 7, the handle has been moved from the position in FIG. 6 to the position in FIG. 7 and still lies beyond the full dynamic zone. The microcomputer 56 would reduce the dynamic braking by 30% to 70% while maintaining the 40% air brake. Further reduction below the full dynamic detent as in FIG. 8, further reduces the dynamic braking to 30% of full dynamic braking while maintaining the air braking at 40. As illustrated in FIG. 9, further decreasing the handle to a position, which is 0% dynamic braking, will maintain 40% air braking.

Figure 10:
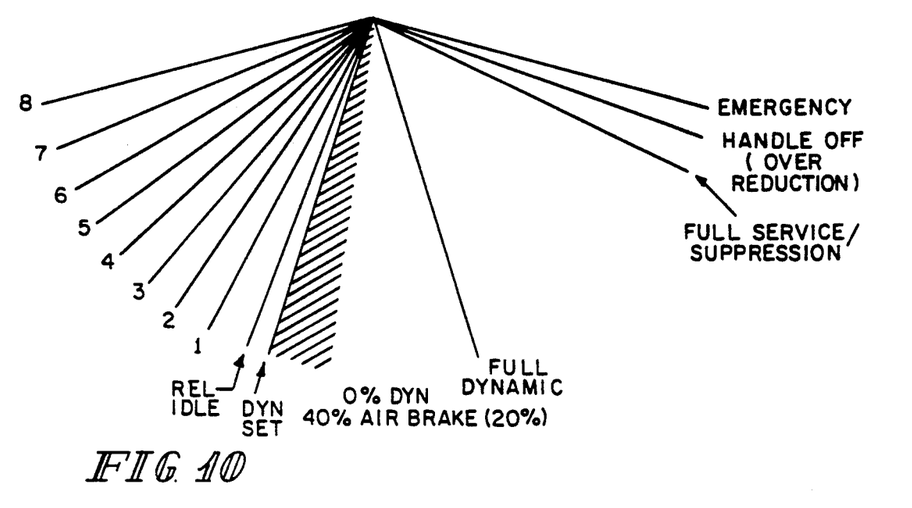
FIG. 10 is a diagram of a decreased braking position from that of FIGS. 6, 7, 8 or 9.

A further reduction, as illustrated in FIG. 10 below the position of FIG. 9, maintains the relationship of 0% dynamic braking and 40% air braking. On a train, for example a freight train, where there is no graduated release of air brakes, to release the 40% of the air brakes the handle would have to be moved to the detent dynamic set position. If the single handle controller is provided on a train which has gradual release of the air brakes, the position illustrated in FIG. 10 would represent 0% dynamic braking and 20% air braking.

It should be noted that the positions and the equivalent percentage of dynamic and air braking of FIGS. 7-10 reflect a decrease from the position of FIG. 6 with no intermediate increases. For any movement back towards the dynamic set position, the microcomputer 56 decreases the dynamic braking until no dynamic braking signal is reached and then either maintains the fluid braking pressure or decreases the fluid braking pressure next, depending upon the kind of train braking system used. Thus for initial or increased positioning, the dynamic braking is applied first until it reaches 100% at which point fluid braking is applied and for decreased positioning, the dynamic braking is removed until it reaches zero and then the fluid brake is either held or decreased, depending upon the type of train braking system.

Figure 11:
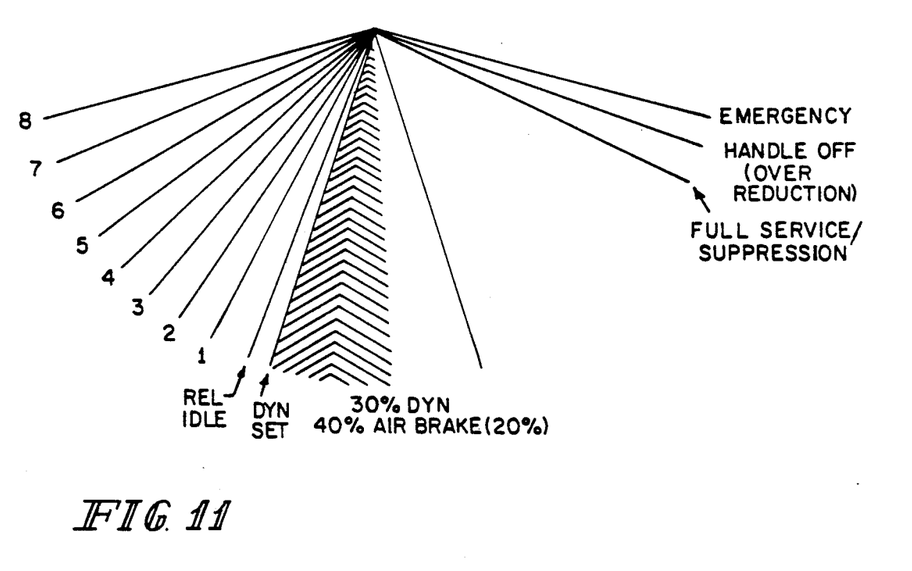
FIG. 11 is a diagram of an increased braking position from that of FIG. 10 and is an identical position to that of FIG. 9.

When the position of the handle is increased from the position in FIG. 10 to the position in FIG. 11, the dynamic braking is increased to 30% while the air brake is maintained. For braking systems which have nongraduated release, this is the 40% while for systems which have graduated release it would be the 20%. Note, that although the handle position of FIGS. 9 and 11 are identical, the amount of dynamic and fluid braking is different since they depend on the prior movements of the handle.

Figure 12:
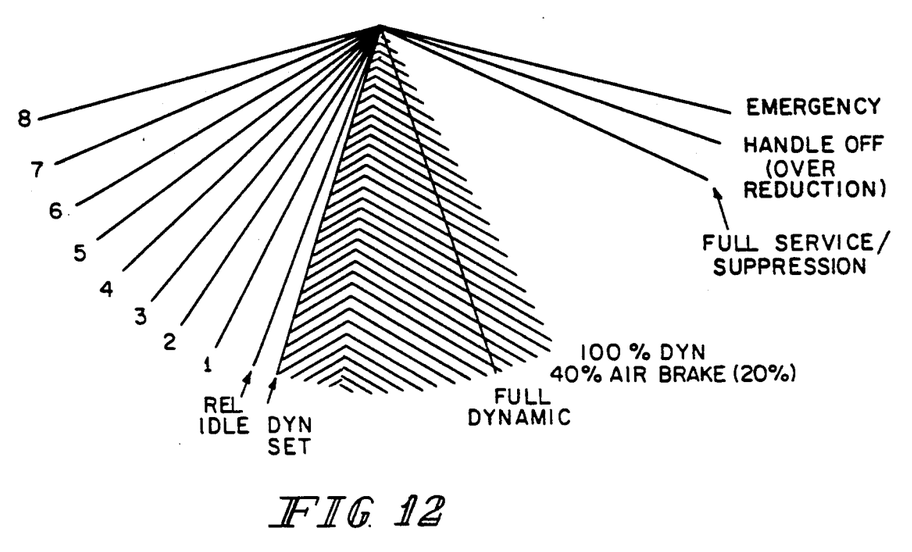
FIG. 12 is a diagram of an increased braking position from that of FIGS. 10 or 11 and is an identical position to that of FIG. 7.

If additional air braking is required, the handle must be moved through at least a 100% dynamic braking position before additional air braking would be applied. Thus from either of the positions of FIGS. 10 and 11, the handle must be moved to the position illustrated in FIG. 6 for the nongraduated release valve since this position would represent 100% dynamic and 40% air braking. The microcomputer 56 would first apply the dynamic braking to 100% with no additional fluid braking until the position of FIG. 6 has been passed. For braking systems where graduated release is available, additional fluid or air brake would be applied after the position of FIG. 12 is reached. This would represent 100% dynamic braking and 20% air braking wherein the lowest decrease would be the position of FIG. 10. Again the microcomputer 56 would provide the maximum 100% dynamic braking before any additional air braking above the 20% would be applied.

It should be noted that the position in FIG. 12 is the same as that in FIG. 7 but with different values of the dynamic and fluid braking since the microcomputer 56 interprets the position based on the prior history or motion of the handle. If it was a nongraduated release brake system, the position of FIG. 12 would still be only 100% dynamic braking with 40% air braking and the position in FIG. 6 must be reached before additional air braking would be applied.

The microcomputer 56 enforces the application of the dynamic braking first and does not apply any fluid braking until 100% of the dynamic braking has been applied. For any decrease of the position handle, the system is considered a FIFO or first-in-first-out system such that the dynamic braking is reduced first to zero before any reduction in the air braking. By applying the dynamic brakes first, it reduces the maintenance on the train brakes since the air brakes on the train are applied last. Thus for a slow down, the dynamic brakes would be applied. The dynamic brakes are electrically controlled brakes and therefore may be reversed or released very quickly by merely moving the handle into the propulsion zone. With fluid or air brakes, there is an amount of time required to recharge the brake pipe to release the brakes.

By removing the independent brake handle from the master control stand 50, it also prevents the operator from applying the air brakes of the locomotive to slow down the train and forces them to use the dynamic electric brake. Also this prevents the operator from applying the electric dynamic brakes and the independent air brakes on the locomotive simultaneously which is contrary to approved operating procedures.

Although not desired, an independent brake handle may be provided for the locomotive brakes to allow operation at very low speeds after a major stop. This and other situations where the dynamic braking would not be sufficient, would allow operation of only the locomotive brakes and therefore would required less time to be released than if the train brakes were used.

The ability of the present system to allow the engineer to reduce the dynamic braking effort as required to maintain pneumatic or fluid braking is advantageous for example, in cresting hills and coming to a stop. The shifting of the dynamic brake zone to the leading edge of either the increasing or decreasing position of the handle gives the operator the feel of complete direct control over the dynamic braking. Any movement of the braking handle to the right increases dynamic braking and any movement of the handle to the left decreases dynamic braking irrespective of the position of the handle in any of the braking zones. The operator does not have to move the handle all the way back into the dynamic braking zone of FIG. 4. Thus the engineer does not have to be substantially retrained and will continue to be able to operate the system under the seat of the pants with only a single hand.

The visual screen 52 would display the images shown in FIGS. 4–12 with the dynamic braking being one color and the fluid or air braking being a second color or by appropriate cross hatching. This will allow the operator to see how much dynamic braking has been applied and when there is no dynamic braking. Alternatively, an indicator such as a light or other visual or audio indicators could be provided indicating when the dynamic braking has been reduced to zero.

The visual display 52 would not only display the amount of dynamic braking by the sections of a pie, but also appropriate numerical displays will be provided. Thus it would allow the operator to see that in a non-graduated release, the amount of air brake which has been applied, even though the position of the handle has been reduced from the previously tried brake position such that the portion of the pie representing the air brakes, is not a true indication of the amount of air brakes applied. Since a dynamic brake is always shown at the leading edge, the motion of the handle would indicate an increase or decrease of that portion of the pie.

Figure 13A:
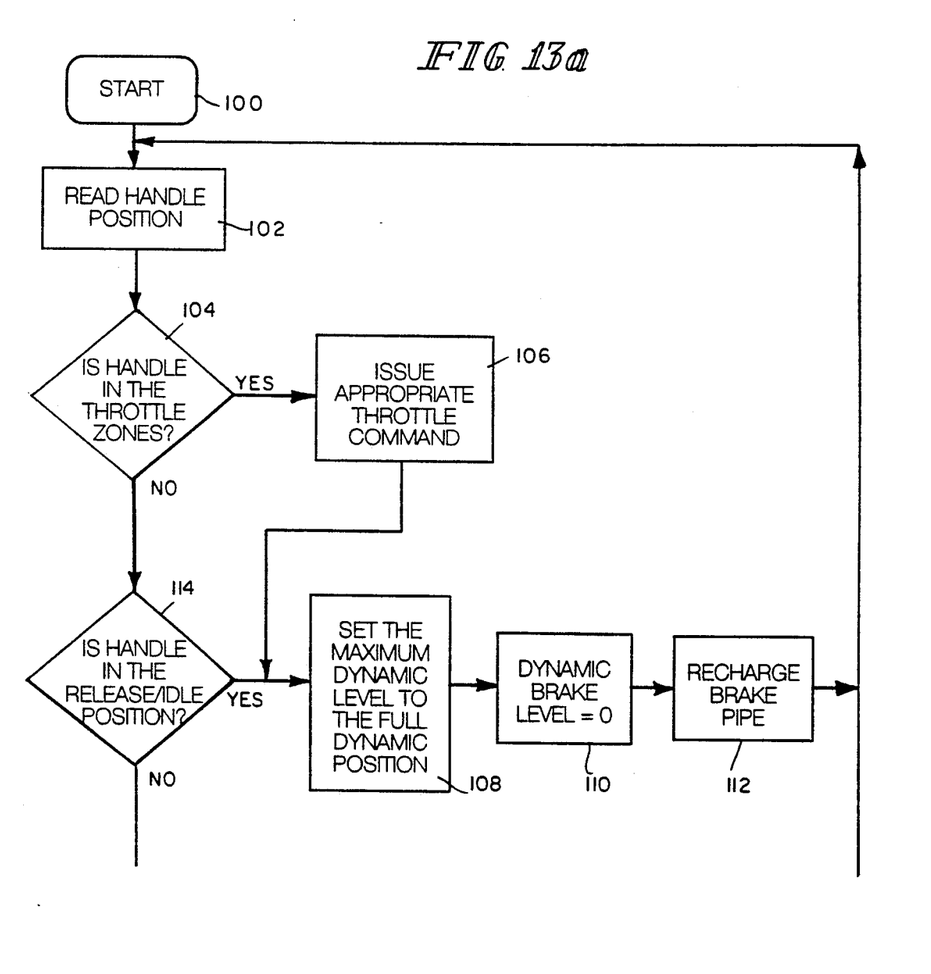
FIGS. 13a and 13b are flow charts of a program according to the principles of the present invention.
Figure 13B:
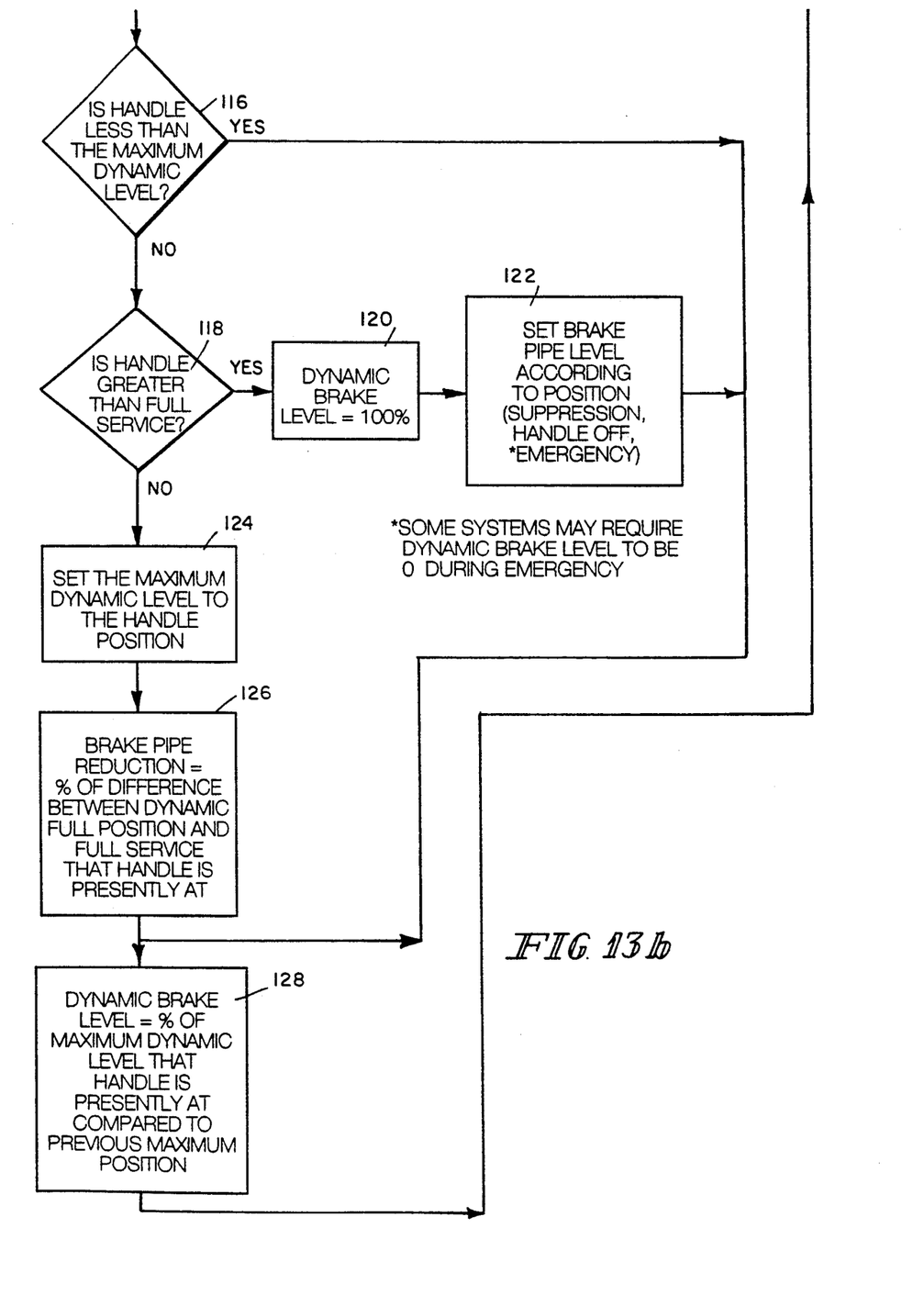

An appropriate flow diagram for the computer operation to achieve the operation described above is illustrated in FIGS. 13a and b. The controller begins at START 100 and reads the handle position at 102. At 104, a decision is made as to whether the handle is in the throttle or proportion zone. If it is, the appropriate throttle command is issued at 106. Also, the maximum dynamic level is set to the full dynamic position of the Figures at 108, the dynamic brake level is set to zero at 110 and the brake pipe is recharged at 112. The program then moves back to reading the handle position at 102. If the handle is not in the throttle zone at 104, then a determination is made at 114 whether the handle is at the release/idle position. If it is, the setting of the maximum dynamic brake level, setting the dynamic brake level to zero and recharging the brake pipe of branch 108, 110 and 112 is again traversed. If the handle is not in the idle zone at 114 and has also been determined at 104 to not be in the throttle zone, the braking routine begins.

A determination is made at 116 of whether the handle is less than the maximum dynamic level which had been previously sent at 108 to the full dynamic position of the drawings. If the answer is yes, the dynamic brake level is set at 128 to the percentage of the maximum dynamic level, which is the full dynamic position, that the handle is presently at. The program is then looped back to again reading the handle position at 102. Thus for any positioning of the handle which has not exceeded the maximum dynamic brake level of the full dynamic position, the dynamic brake will be proportional to its position relative to the full dynamic position of the figures.

If the decision at 116 is that the handle is not less than the maximum dynamic level which at this point has been set at full dynamic position, a determination is made at 118 as whether the handle is greater than the full service position. If it is greater than the full service position, the dynamic braking level is set to 100% at 120 and the brake pipe level is set according to the position of the handle in either the suppression, handle off or emergency condition. Although the output of decision 122 is shown connected to decision 128 where the dynamic brake level is set to the percentage of maximum dynamic brake level that the handle is presently at compared to the previous maximum position, it may also go directly back to box 102. Since the handle will be beyond the full service zone, the dynamic brake level is set to 100% and the position would be at 100%.

If the decision at 118 is that the handle is not greater than full service and it has been determined at 116 that the handle is not less than the maximum dynamic level which has been set at 108 to the full dynamic position, the maximum dynamic level is set at 124 to the present handle position Thus as illustrated in FIG. 6 for example, the maximum dynamic level has been moved from the full dynamic position to the leading edge of the crossed hatching. Next at 126, the brake pipe reduction or percentage of air braking is set equal to the percentage of the difference between the dynamic full position and full service that the handle is presently at. Thus again in FIG. 6, the dynamic position has moved to the most leading edge in a counterclockwise direction and the air braking is set at 40% which represents the other crossed hatch area between the dynamic set position and the other crossed hatch section. The dynamic brake level at 128 is set to the percentage of the maximum dynamic level that the handle is presently at compared to the previous maximum position which was set at 108 to the full dynamic position prior to being reset at 124. Since this is not a decrease, 100% of the dynamic braking is provided along with an appropriate percentage of the air braking. The program then loops back to re-read the handle again at 102.

On subsequent passes through decision blocks 124, 126 and 128, the dynamic braking is reduced first for decreasing handle positions and it is increased first with respect to increasing handle positions. In those situations where the air brake may not be reduced, the decision at 126 will make the appropriate adjustment only for increasing and not decreasing the brake pipe reduction. Thus it can be seen that the flow chart of FIG. 13 achieves the objects of the present invention described with respect to the previous of FIGS. 4–12.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A train propulsion and braking controller comprising:
   handle means, including a single handle movable between a maximum propulsion position, through diminishing propulsion positions, through a release/idle position, through increasing braking positions, through a full service braking position, to an emergency brake position, for providing a position signal representing a position of said handle;
   control means for receiving said position signal and generating propulsion, dynamic braking, and fluid braking control signals as a function of said position signal;

when said handle position assumes an initial braking position, said control means generates a dynamic braking signal necessary for said initial braking position until a maximum value of dynamic braking signal is generated and generates a fluid braking signals after said maximum value of dynamic braking signal is generated if necessary for said initial braking position; and when said handle assumes a next braking position less than a previous braking position, said control means generates a dynamic braking signal of a smaller value than a dynamic braking signal of said previous braking position and maintains a fluid braking signal of said previous braking position until a zero dynamic braking signal is generated.

2. A controller according to claim 1, wherein said handle means includes an off position between said full service braking position and said emergency brake position.

3. A controller according to claim 1, wherein said braking positions include a dynamic braking range of positions increasing from said release/idle position to a full dynamic braking position and a fluid braking range of positions increasing from said full dynamic braking position to said full service braking position.

4. A controller according to claim 3, wherein when said handle position assumes an initial braking position in said dynamic braking range, said control means generates only dynamic braking signals; and when said handle position assumes an initial braking position in said fluid braking range, said control means generates a combination of dynamic and fluid braking signals.

5. A controller according to claim 4, wherein when said handle position assumes an initial braking position in said fluid braking range, said control means generates a maximum dynamic braking signal and a fluid braking signal for said initial braking position.

6. A controller according to claim 3, wherein said handle means includes a detent for said handle at said full dynamic braking position.

7. A controller according to claim 1, wherein when said handle assumes a next braking position greater than a previous braking position, said control means generates a dynamic braking signal of a greater value than a dynamic braking signal of said previous braking position until a maximum value of dynamic braking signal is generated and generates a fluid braking signals of a greater value than a fluid braking signal of said previous braking position after said maximum value of dynamic braking signal is generated for said next braking position.

8. A controller according to claim 1, wherein when said handle assumes a next braking position less than a previous braking position, said control means generates a fluid braking signal of a smaller value than a fluid braking signal of said previous braking position after said zero dynamic braking signal is generated for said next braking position.

9. A controller according to claim 1, including a display means for displaying the handle position.

10. A controller according to claim 9, wherein said display means displays graphically the amount of dynamic braking and the presence of any fluid braking.

11. A controller according to claim 9, wherein said display means displays numerically the amount of dynamic braking and the amount of any fluid braking.

12. A train propulsion and braking controller comprising:

handle means, including a single handle movable between a maximum propulsion position, through diminishing propulsion positions, through a release/idle position, through increasing braking positions, through a full service braking position, to an emergency brake position, for providing a position signal representing a position of said handle;

control means for receiving said position signal and generating propulsion, dynamic braking, and fluid braking control signals as a function of said position signal;

when said handle position assumes an initial braking position, said control means generates a dynamic braking signal and generates a fluid braking signals if necessary for said initial braking position; and when said handle assumes a next braking position less than a previous braking position, said control means generates a dynamic braking signal of a smaller value than a dynamic braking signal of said previous braking position and maintains a fluid braking signal of said previous braking position until a zero dynamic braking signal is generated and generates a fluid braking release signal of a smaller value than a fluid braking signal of said previous braking position only when said handle is in said release/idle position.

13. A train propulsion and braking controller comprising:

handle means for providing position signals representing positions from a maximum propulsion position through decreasing propulsion positions to an idle position and positions from release, through increasing braking positions, through a full service braking position, to an emergency brake position;

control means for receiving said position signal and generating propulsion, dynamic braking, and fluid braking control signals as a function of said position signal;

for an initial braking position signal, said control means generates a dynamic braking signal necessary for said initial braking position until a maximum value of dynamic braking signal is generated and generates a fluid braking signals after said maximum value of dynamic braking signal is generated if necessary for said initial braking position;

for subsequent braking position signals less than a previous braking position signal, said control means generates a dynamic braking signal of a smaller value than a dynamic braking signal of said previous braking position signal while maintaining any fluid braking signal of said previous braking position signal until a zero dynamic braking signal is generated; and for subsequent braking position signals greater than a previous braking position signal, said control means generates a dynamic braking signal of a greater value than a dynamic braking signal of said previous braking position signal while maintaining any fluid braking signal of said previous braking position signal until a maximum value of dynamic braking signal is generated.

14. A controller according to claim 13, wherein when said subsequent braking position signal is greater than a previous braking position signal, said control means generates a fluid braking signals of a greater value than a fluid braking signal of said previous braking position signal after said maximum value of dynamic braking signal is generated for said subsequent braking position signal.

15. A controller according to claim 13, wherein when said subsequent braking position signal is less than a previous braking position signal, said control means generates a fluid braking signal of a smaller value than a fluid braking signal of said previous braking position signal after a zero dynamic braking signal is generated for said subsequent braking position signal.

* * * * *